(12) United States Patent
Dreps et al.

(10) Patent No.: US 9,473,333 B2
(45) Date of Patent: Oct. 18, 2016

(54) COMMUNICATIONS SYSTEM VIA DATA SCRAMBLING AND ASSOCIATED METHODS

(75) Inventors: Daniel M. Dreps, Georgetown, TX (US); Frank D. Ferralolo, New Windsor, NY (US); Robert J. Reese, Austin, TX (US); Martin L. Schmatz, Rueschlikon (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1857 days.

(21) Appl. No.: 12/028,953

(22) Filed: Feb. 11, 2008

(65) Prior Publication Data

US 2009/0202076 A1    Aug. 13, 2009

(51) Int. Cl.
*H04L 9/00*   (2006.01)
*H04L 25/03*  (2006.01)

(52) U.S. Cl.
CPC .............................. *H04L 25/03866* (2013.01)

(58) Field of Classification Search
CPC ................................................ H04L 25/03866
USPC ........................................................ 380/270
See application file for complete search history.

(56) References Cited

U.S. PATENT DOCUMENTS

| | | | |
|---|---|---|---|
| 3,798,544 A | 3/1974 | Norman | 325/38 |
| 4,790,009 A * | 12/1988 | Ishigaki et al. | 380/274 |
| 4,864,617 A * | 9/1989 | Holmquist | 380/267 |
| 4,965,881 A | 10/1990 | Dilley | 380/50 |
| 5,163,092 A | 11/1992 | McNesby et al. | 380/28 |
| 5,185,799 A | 2/1993 | McNesby et al. | 380/28 |
| 6,304,482 B1 | 10/2001 | Lin et al. | 365/154 |
| 6,512,758 B1 * | 1/2003 | Sato et al. | 370/344 |
| 6,549,595 B1 * | 4/2003 | Den Besten et al. | 375/360 |
| 2004/0128533 A1 | 7/2004 | Choi et al. | |
| 2004/0158752 A1 * | 8/2004 | Borza et al. | 713/320 |
| 2005/0008036 A1 | 1/2005 | Hsu et al. | |
| 2006/0104373 A1 | 5/2006 | Bar-Ness et al. | |
| 2006/0262873 A1 | 11/2006 | Johansson | |

FOREIGN PATENT DOCUMENTS

| | | | | |
|---|---|---|---|---|
| JP | 09161400 A | 6/1997 | | G11B 20/10 |
| WO | WO 8500259 A * | 1/1985 | | |
| WO | WO 2004/082230 A1 | 9/2004 | | H04L 25/03 |

OTHER PUBLICATIONS

International Search Report and Written Opinion for International Application No. PCT/EP2009/050819 dated Sep. 22, 2009, pp. 1-11.

* cited by examiner

*Primary Examiner* — Matthew Henning
(74) *Attorney, Agent, or Firm* — Margaret A. McNamara; Ido Tuchman

(57) ABSTRACT

A communications system that may include a transmitter, a receiver, connected over a communications network. A communication link on the communications network may transfer data between the transmitter and the receiver. The system may also include a logic unit to scramble a plurality of portions of the data at the transmitter based upon the communication link and may unscramble the plurality of portions of the data at the receiver. As a result, the logic unit may provide improved performance of the communication link and/or reduced power consumption of the communication link.

4 Claims, 11 Drawing Sheets

$$G(x) = 1 + x^{39} + x^{58}$$

THE SERIAL SCRAMBLER IMPLEMENTATION IS:

THE SERIAL DESCRAMBLER IMPLEMENTATION IS:

COMMUNICATIONS SYSTEM VIA DATA SCRAMBLING AND ASSOCIATED METHODS

FIELD OF THE INVENTION

The invention relates generally to the field of communications systems, and in particular to the area of communication links for such.

BACKGROUND OF THE INVENTION

In typical communication links the receive side circuitry detects the phase of the incoming data transitions and processes them in order to optimally sample the data. The relative phase location of the incoming data transitions are compared to a local clock (at or near the bit rate) and used to determine where edges occur, and where the data is most stable (see FIG. 1).

However, if no transitions occur for extended periods of time, phase information cannot be gathered and the risk of data drifting and a phase error accumulates between the incoming data and the local clock. If this condition persists for too long, synchronization can be lost or data errors can take place.

Data scrambling is a common technique used to increase and ensure sufficient transition density on the data to be transmitted over a communication link. Data scrambling is a logical operation which mixes the raw data to be sent with a predetermined sequence, e.g. mixture of logical ones and zeros.

This sequence may be expressed as a mathematical polynomial such as the polynomial in FIG. 2 where x represents raw data and G(x) represents scrambled data. The mixing or summing may be as simple as an Exclusive OR of the raw data and the scramble pattern.

In general, the scrambling pattern is implemented in a number of different ways depending on the designer's application and needs. A scramble pattern's complexity and length may ensure transitions on data with little or no limitations on the raw data to be transmitted.

There is always the likelihood the exact inverse of the scramble pattern is generated in the data, defeating the purpose of scrambling in the first place. In order to minimize the statistical probability of this event occurring, or if occurring, occurring for extended periods of time, more complex scramble patterns with an increased number of bits are generated.

Typically the pattern is generated using a Linear Feedback Shift Register (LFSR) where the delay through the register is equivalent to the polynomial (see FIG. 2). The summing or mixing can be as simple as a logical Exclusive OR gate, where X is the raw data, and G(x) is the scrambled pattern. Whatever operation may be performed on the transmit side, it should be complimented with the reverse operation (de-scramble) on the receive side.

One of the simplest and most straight forward methods to synchronize the scramble and descramble operations on the two ends of the links is through trial and error. For example, on the transmit side the scramble pattern is fixed and mixed with a known initialization sequence. The same fixed pattern is also found on the receive side, but the starting point is unknown because of the latency and initial starting point of the descramble logic. As a result, the receive side does a search to align its logic to the incoming data using an algorithm that manipulates the descramble pattern one shift register at a time. Only when the descramble pattern is perfectly matched to the incoming scrambled data will the initialization pattern be outputted on the receive side without errors.

In addition, two extreme cases exist for the purposes of power dissipation associated with scrambling data. If the raw data to be transmitted is all zeros or all ones, then the power dissipation would be relatively low without scrambling but relatively high with scrambling. If, however, there is significant switching on the raw data, then the additional power dissipation because of scrambling would be quite small or zero. The average power dissipation would be somewhere between these two extremes.

Further, different links and/or different applications require different amounts of scrambling. For example, a source synchronous link (a link where the clock is sent with the data) has much lower data transition requirements than a link where the clock must be extracted from the data and/or the local clock is at a different frequency than the incoming data. There are also system circumstances such as power savings mode where the voltage may be decreased or returned to a nominal value which creates a transient condition on the link.

SUMMARY OF THE INVENTION

In view of the foregoing background, it is therefore an object of the invention to provide improved performance of a communication link and/or reduced power consumption of the communication link in a communications system.

This and other objects, features, and advantages in accordance with the invention are provided by a communication system that may include a transmitter, a receiver, and a communications network. A communication link on the communications network may transfer data between the transmitter and the receiver.

The system may further include a logic unit to scramble a plurality of portions of the data at the transmitter based upon the communication link and may unscramble the plurality of portions of the data at the receiver. As a result, the logic unit may provide improved performance of the communication link and/or reduced power consumption of the communication link.

The system may also include a control register to limit the scrambling performed by the logic unit. The control register may be statistically programmed to limit the scrambling performed by the logic unit.

The system may also include a clock in communications with the logic unit, and a feedback shift register to limit the scrambling based upon the clock. The system may alternately include a clock in communications with the logic unit, and a feedback shift register that controls the data provided to the logic unit to limit scrambling without affecting the clock.

The logic unit may dynamically alter the scrambling. The logic unit may insert a command into the data to control the scrambling and unscrambling. The logic unit may send an out-of-band signal with the data to control the scrambling and unscrambling. The system may also include a counter that controls the scrambling and unscrambling performed by the logic unit.

Another aspect of the invention is a method to improve a communication system including transferring data between a transmitter and a receiver via a communication link, and scrambling a plurality of portions of the data at the transmitter based upon the communication link. The method may also include unscrambling the plurality of portions of the data at the receiver to provide improved performance of the communication link and/or reduced power consumption of the communication link based upon the scrambling and unscrambling.

The method may further include limiting the scrambling via a control register. The method may also include statistically programming the control register to limit the scrambling performed.

The method may further include controlling a feedback shift register via a clock to limit scrambling.

The method may also include limiting scrambling via a feedback shift register. The method may further include dynamically altering the scrambling. The method may further include inserting a command into the data that controls the scrambling and unscrambling.

The method may also include sending an out-of-band signal with the data to control the scrambling and unscrambling. The method may further include controlling the scrambling and unscrambling via a counter.

DETAILED DESCRIPTION OF THE PREFERRED EMBODIMENTS

Figure 1:
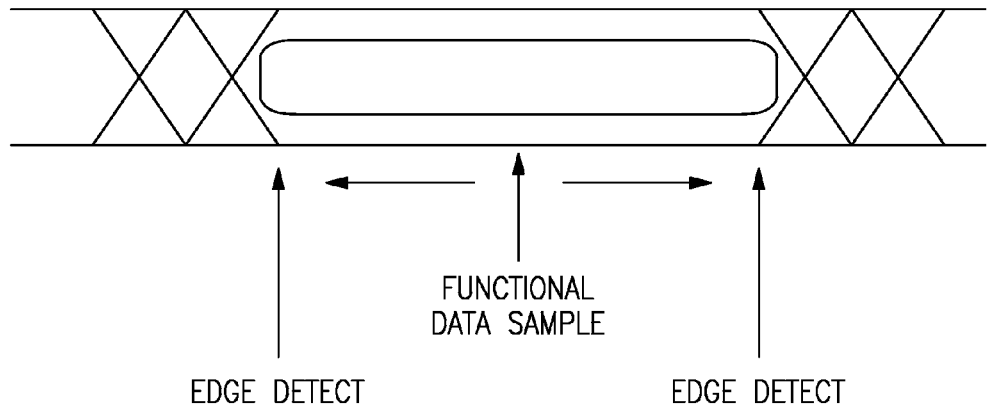
FIG. 1 is a block diagram illustrating a data valid window in the prior art.
Figure 2:
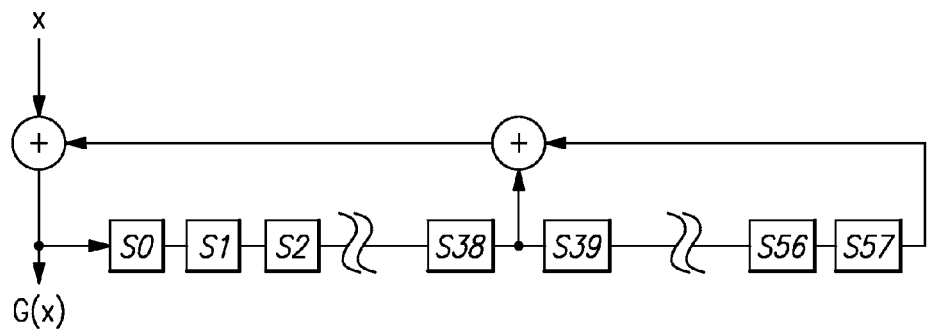
FIG. 2 is a block diagram illustrating a data scrambling polynomial in the prior art.
Figure 2:
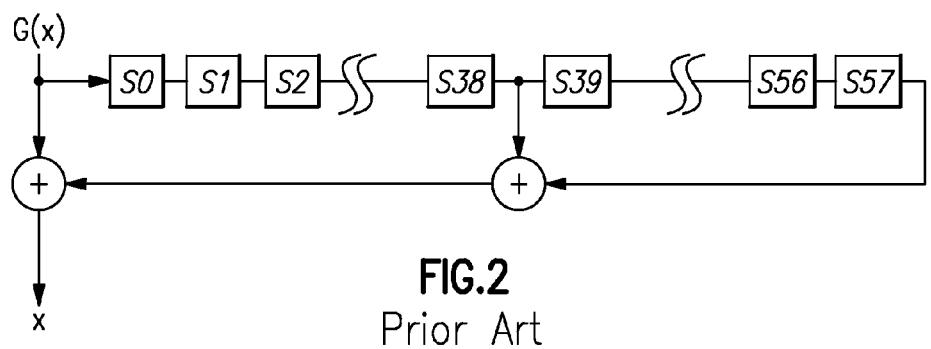

The invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

As will be appreciated by one skilled in the art, the invention may be embodied as a method, system, or computer program product. Furthermore, the invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device.

Computer program code for carrying out operations of the invention may be written in an object oriented programming language such as JAVA™, Smalltalk, C++ or the like. However, the computer program code for carrying out operations of the invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The invention is described below with reference to flowchart illustrations and/or block diagrams of methods, apparatus (systems) and computer program products according to exemplary embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 3:
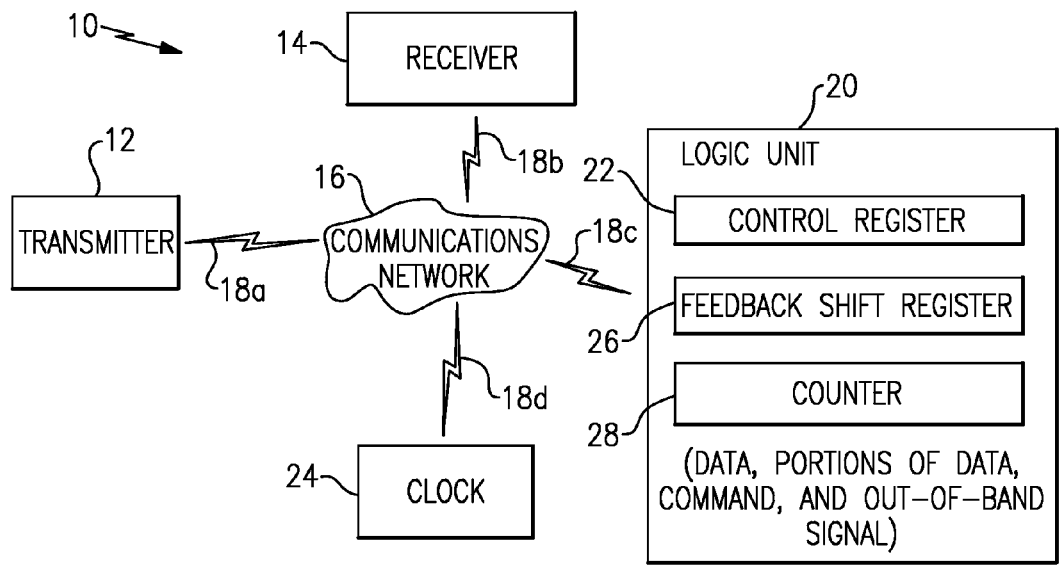
FIG. 3 is a block diagram illustrating a system to improve a communications system in accordance with the invention.

Referring initially to FIG. 3, an improved communications system 10 is initially described. The system 10 can be implemented in software, firmware, hardware, or any combination thereof. The system 10 includes a transmitter 12, a receiver 14, and a communications network 16. The communications network 16 is a wired and/or wireless network as will be appreciated by those of skill in the art. Communication links 18a and 18b on the communications network 16 transfer data between the transmitter 12 and the receiver 14, for example.

The system 10 also includes a logic unit 20, which is hardware and/or software for executing programmable instruction, for example. The logic unit 20 is connected to communications network 16 via communication link 18c and the logic unit scrambles a plurality of portions of the data at the transmitter 12 based upon the communication links 18a and 18b, and unscrambles the plurality of portions of the data at the receiver 14, for instance. As a result, the logic unit 20 may provide improved performance of the communication links 18a and 18b and/or reduced power consumption by the communication links.

In one embodiment, the system 10 also includes a control register 22 to limit the scrambling performed by the logic unit 20. The control register 22 may be statistically programmed to limit the scrambling performed by the logic unit 20.

In another embodiment, the system 10 also includes a clock 24 in communications with the logic unit 20 via communication link 18d. The clock 24 and a feedback shift register 26 are used by the logic unit 20 to limit the scrambling based upon the clock. Alternatively, the system may include the clock 24 in communications with the logic unit 20, and a feedback shift register 26 that controls the data provided to the logic unit to limit the scrambling without affecting the clock.

In one embodiment, the logic unit 20 dynamically alters the scrambling. In another embodiment, the logic unit 20 inserts a command into the data to control the scrambling and unscrambling.

In one embodiment, the logic unit 20 sends an out-of-band signal with the data to control the scrambling and unscrambling. In another embodiment, the system 10 further includes a counter 28 that controls the scrambling and unscrambling performed by the logic unit 20. Accordingly, the system 10 provides a means of manipulating the scrambling pattern in such a way to reduce power and lower the transition density, and/or at the expense of increased power, provide additional transition density or a high switching rate on the scramble pattern.

To achieve the foregoing, in one embodiment, the control signals would be statically programmed and hence the amount of scrambling at power on could be limited through the use of one or more control registers, e.g. control register 22. In another embodiment, the scramble pattern would be dynamically altered as the system 10 is operating.

Figure 4:
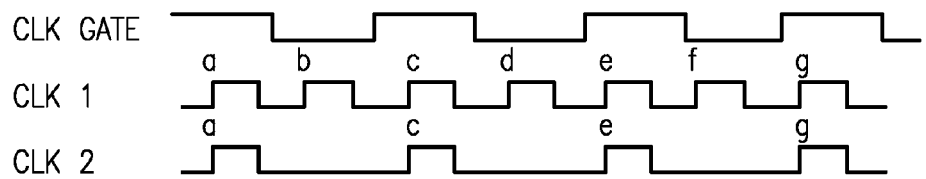
FIG. 4 is a block diagram illustrating various clock gating scenarios to improve the communications system of FIG. 3.

In yet another embodiment, the clock 24 to the feedback shift register 26, e.g. linear feedback shift register, is "clock gated" in order to reduce the scramble pattern, switching to every other bit, for example. The gating of the clock 24 is illustrated in FIG. 4 and shows the clock gate and clk 1 and clk 2, for instance. Clk 1 is produced when no clock gating takes place, e.g. the feedback shift register 26 is clocked at normal (highest) speed. However, when the clock gate (logical AND with the clock) is applied, every other clock is produced to the feedback shift register 26 logic.

The foregoing approach preserves the scramble pattern, but decreases the frequency by a factor of 2. Other clock gates could be generated to scale the scramble pattern by 4, 8, or like or in a more complex way. This control can be applied at power on statically or dynamically to adjust the transition rate in real time. Note this approach reduces both the input/output power associated with scrambling and the power dissipation of the scrambling logic as well.

Figure 5:
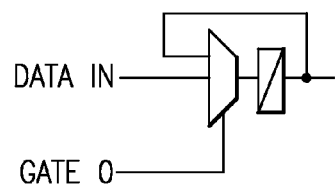
FIG. 5 is a block diagram illustrating data gating of the shift registers in the logic unit of FIG. 3.

Another approach would be to gate the data paths in the logic unit 20's shift registers. The clocking would remain the same, but the data would only be allowed to change every other clock cycle, e.g. on even clock cycles the shift registers would be updated and on odd clock cycles the shift registers would hold their current values (see FIG. 5). The data gate (gate 0) would look like the clock gate in FIG. 4. The advantage to either one of these approaches is the fact the polynomial remains unchanged and it is applicable in general to any polynomial.

Dynamic control of a transmitter/receiver system such as system 10 is more complex than simply setting the control bits at power on. Dynamic operation usually requires coordination between the transmitter 12 and receiver 14 to avoid the loss of synchronization (maintaining a one to one correspondence) of the scramble and descramble functions.

Note as mentioned above, the scramble and descramble of the logic unit 20 could be synchronized at power on through a simple method of trial and error. Although this is simple and straight forward, it does require a significant amount of time, and although it would not be a problem at power on, it would be highly undesirable to shut down the interface to resynchronize the scramble sequence while the system 10, e.g. a computer, was operating.

If however, one was willing to take the interconnect offline, or tolerate a small amount of errors, a solution exists. Once synchronized at power on, changing the scramble pattern on the transmitter 12 side would offset the scramble pattern by the rate reduction plus the latency across any of the communication links 18a-18d.

By detecting errors and the logic unit 20 rate change during scrambling, one could do a reasonable search and detection method to resynchronize the scramble/descramble counts. However, it is assumed the most desirable approach is not to interrupt operation while changing the scramble pattern. Lastly, to facilitate dynamic changes later, the initial synchronization of the scrambling patterns at both ends of the system 10 during power on would be done at the slowest possible setting e.g. the largest count possible.

One way to achieve the foregoing is by in-band scrambling rate change. In other words, sending a command over the system 10 to be recognized on the receiver 14. For example, two bits can be added to the interface protocol and used to preannounce the scrambling rate for the next packet (block of information). 00 are used if the scramble rate is to remain constant, 01 to increase the scramble rate by one increment, 10 to decrease the scramble rate by one decrement. This can be done in various ways with the underlying principle that the control signal mechanism is imbedded in the protocol such as used to identify the scrambling rate and coordinate both ends to change at a predefined point in protocol, e.g. the start of the next packet.

Another way is to use out-of-band signals, e.g. an extra signal added to the bus. For instance, low performance control signals can be added that indicate what the scramble rate is or when it is to change. This signal would be synchronized to the scrambling feedback shift register 26 on both ends of the communication link, e.g. a low frequency signal which is a divide by the scrambling feedback shift register rate.

When the scramble rate is to change, the out-of-band signal(s) are changed to indicate an increment up or down. The receiver 14 detects the change in the out-of-band signal(s) and changes the descramble rate accordingly at a predetermined point in time relative to the out-of-band signals. Note that the out-of-bands signals could also be imbedded in the data signals or clocks which propagate across the system 10. For instance, the common mode voltage of the differential clock could signal a change in the scramble rate, e.g. an increase in the common mode signal could indicate an increase in the scramble rate, or a decrease in the common mode voltage below the nominal voltage would indicate a decrease in the scramble rate.

Yet another way is to have a low speed counter 28 synchronized to the feedback shift register 26 rate on both sides of the link that is initialized at power on with the scramble pattern, e.g. starts and operates at the same time as the scramble pattern. The basis of this approach requires a counter 28 whose period is larger than the time it takes for a command to flow across the system 10 and then to be recognized and acted upon by the receiver 14. This counter 28 would have a direct relationship with the scrambling/descrambling count or be part of the scrambling/descrambling count and control circuitry, e.g. the feedback shift register 26 itself.

In a coordinated way, both ends change the scramble rate using the counter 28. For example, the transmitter 12 would transmit the desired scramble change via a command when the counter 28 reaches all zeros and then change the scramble rate the next time the counter reaches all zeros. The receiver 14 would receive and detect this command to change the scramble rate and change the descrambler to the new setting the next time the local counter reaches all zeros.

In one embodiment, the system 10 uses a technique for serial data scrambling. In another embodiment, the system 10 uses a technique for parallel data scrambling.

Figure 6:
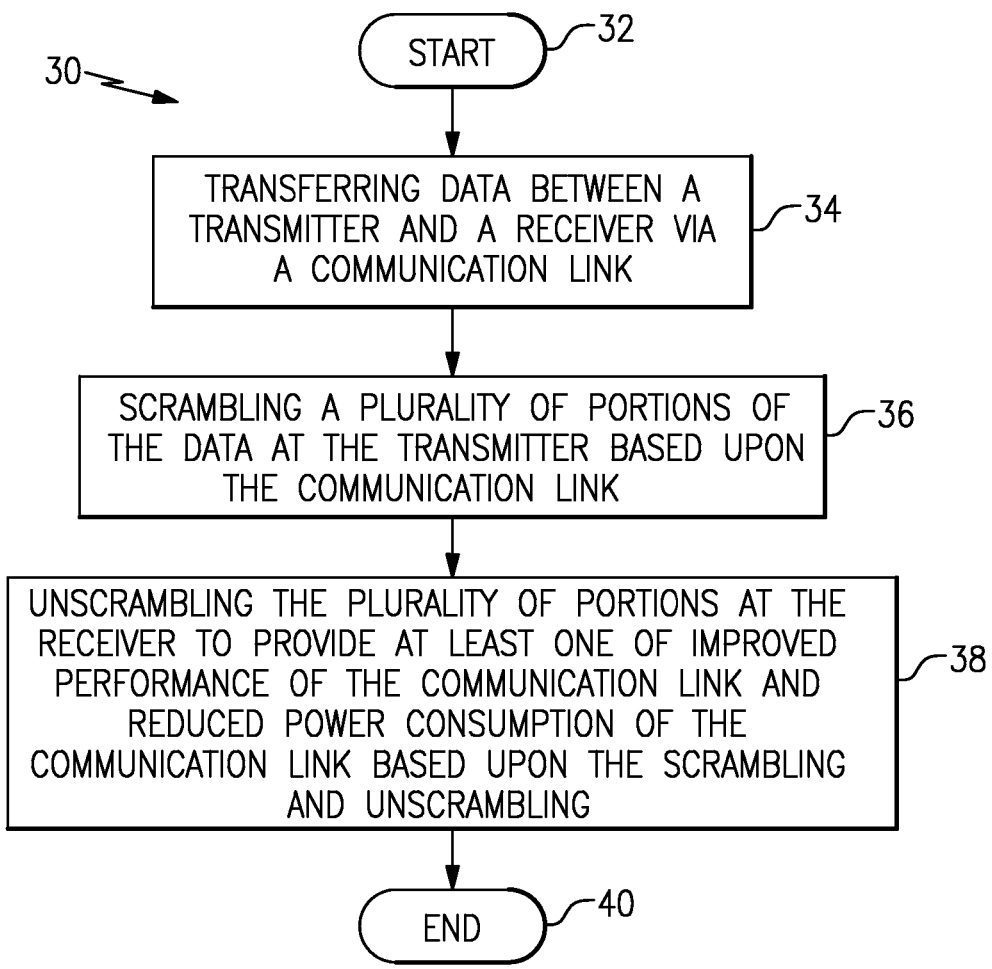
FIG. 6 is a flowchart illustrating a method to improve a communications system in accordance with the invention.

Another aspect of the invention is directed to a method to improve a logic circuit, which is now described with reference to flowchart 30 of FIG. 6. The method begins at Block 32 and may include transferring data between a transmitter and a receiver via a communications link at Block 34, and scrambling a plurality of portions of the data at the transmitter based upon the communication link at Block 36. The method may further include unscrambling the plurality of portions at the receiver to provide at least one of improved performance of the communication link and reduced power consumption of the communication link based upon the scrambling and unscrambling at Block 38. The method ends at Block 40.

Figure 7:
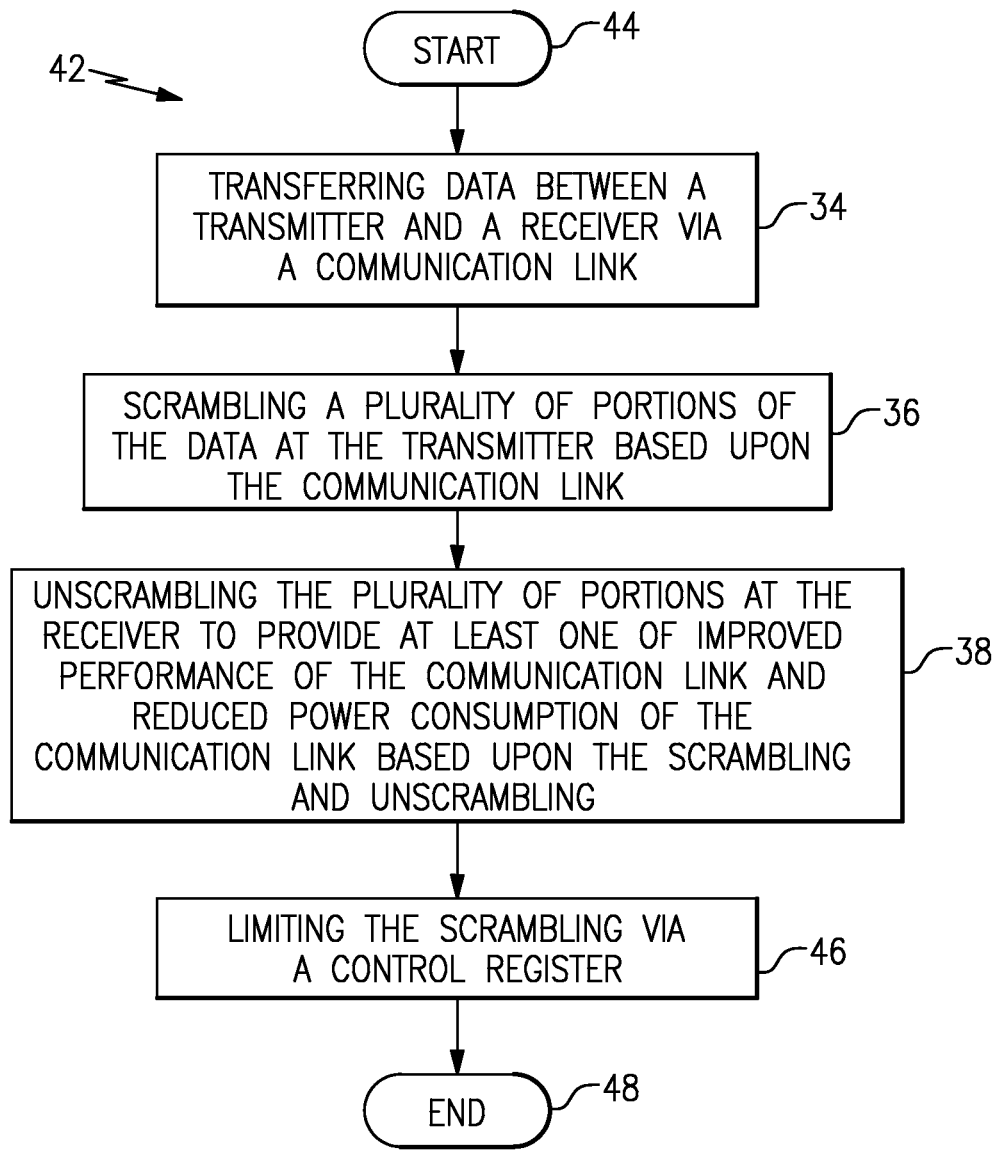
FIG. 7 is a flowchart illustrating another alternative method to improve a communications system using the method of FIG. 6.

In another method embodiment, which is now described with reference to flowchart 42 of FIG. 7, the method begins at Block 44. The method may include the steps of FIG. 6 at Blocks 34, 36, and 38. The method may also include limiting the scrambling via a control register at Block 46. The method ends at Block 48.

Figure 8:
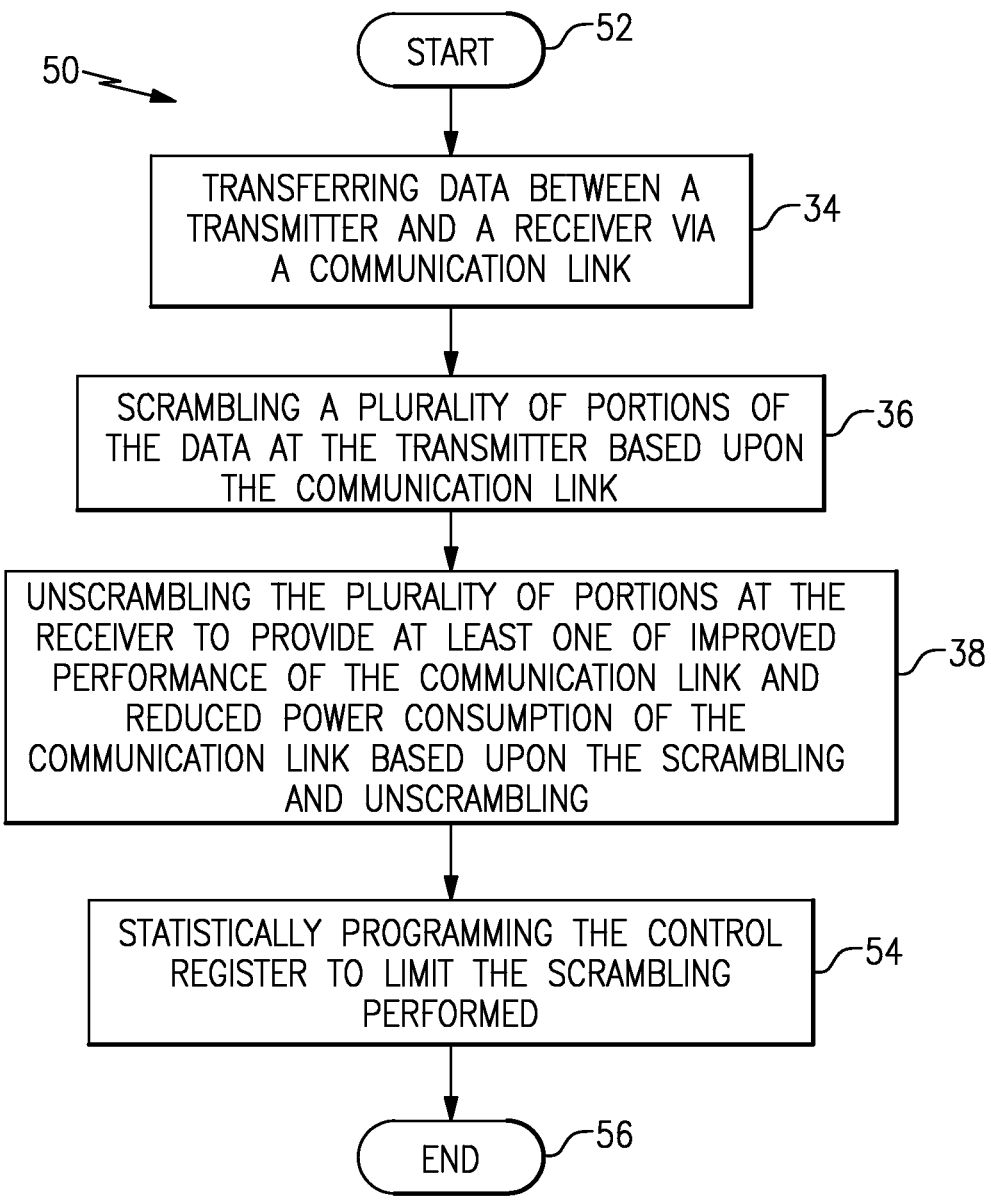
FIG. 8 is a flowchart illustrating another alternative method to improve a communications system using the method of FIG. 6.

In another method embodiment, which is now described with reference to flowchart 50 of FIG. 8, the method begins at Block 52. The method may include the steps of FIG. 6 at Blocks 34, 36, and 38. The method may also include statistically programming the control register to limit the scrambling performed at Block 54. The method ends at Block 56.

Figure 9:
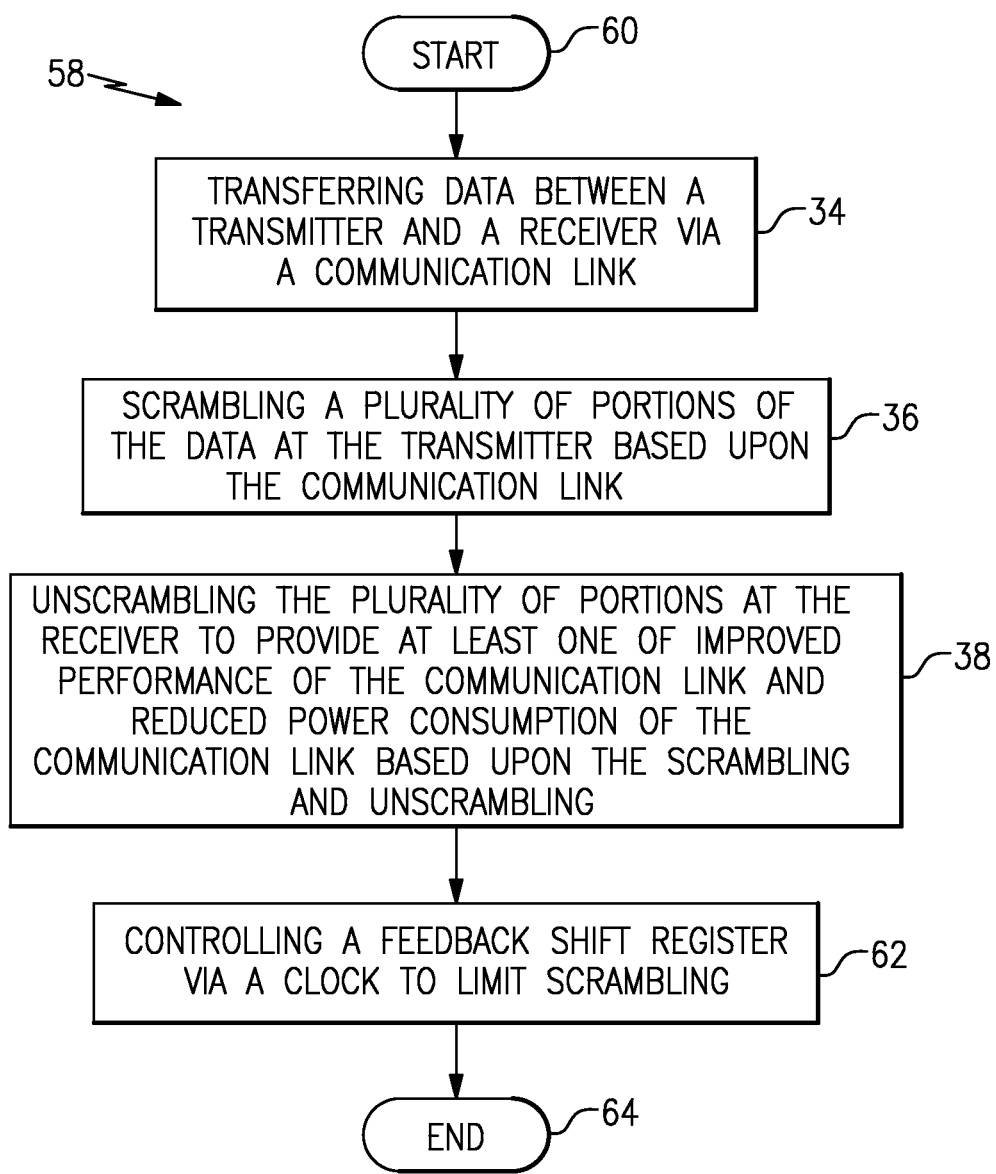
FIG. 9 is a flowchart illustrating another alternative method to improve a communications system using the method of FIG. 6.

In another method embodiment, which is now described with reference to flowchart 58 of FIG. 9, the method begins at Block 60. The method may include the steps of FIG. 6 at Blocks 34, 36, and 38. The method may also include controlling a feedback shift register via a clock to limit scrambling at Block 62. The method ends at Block 64.

Figure 10:
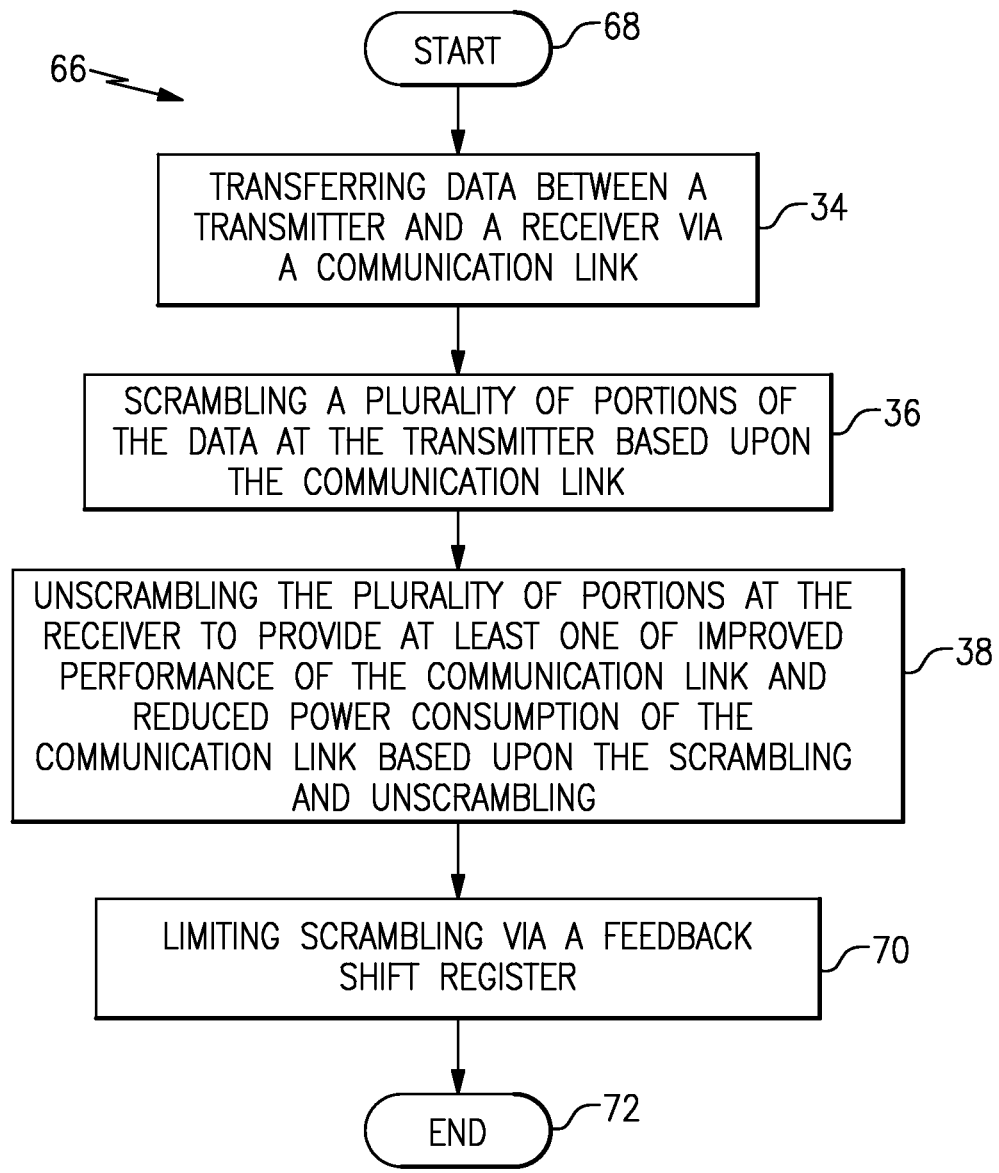
FIG. 10 is a flowchart illustrating another alternative method to improve a communications system using the method of FIG. 6.

In another method embodiment, which is now described with reference to flowchart 66 of FIG. 10, the method begins at Block 68. The method may include the steps of FIG. 6 at Blocks 34, 36, and 38. The method may also include limiting scrambling via a feedback shift register at Block 70. The method ends at Block 72.

Figure 11:
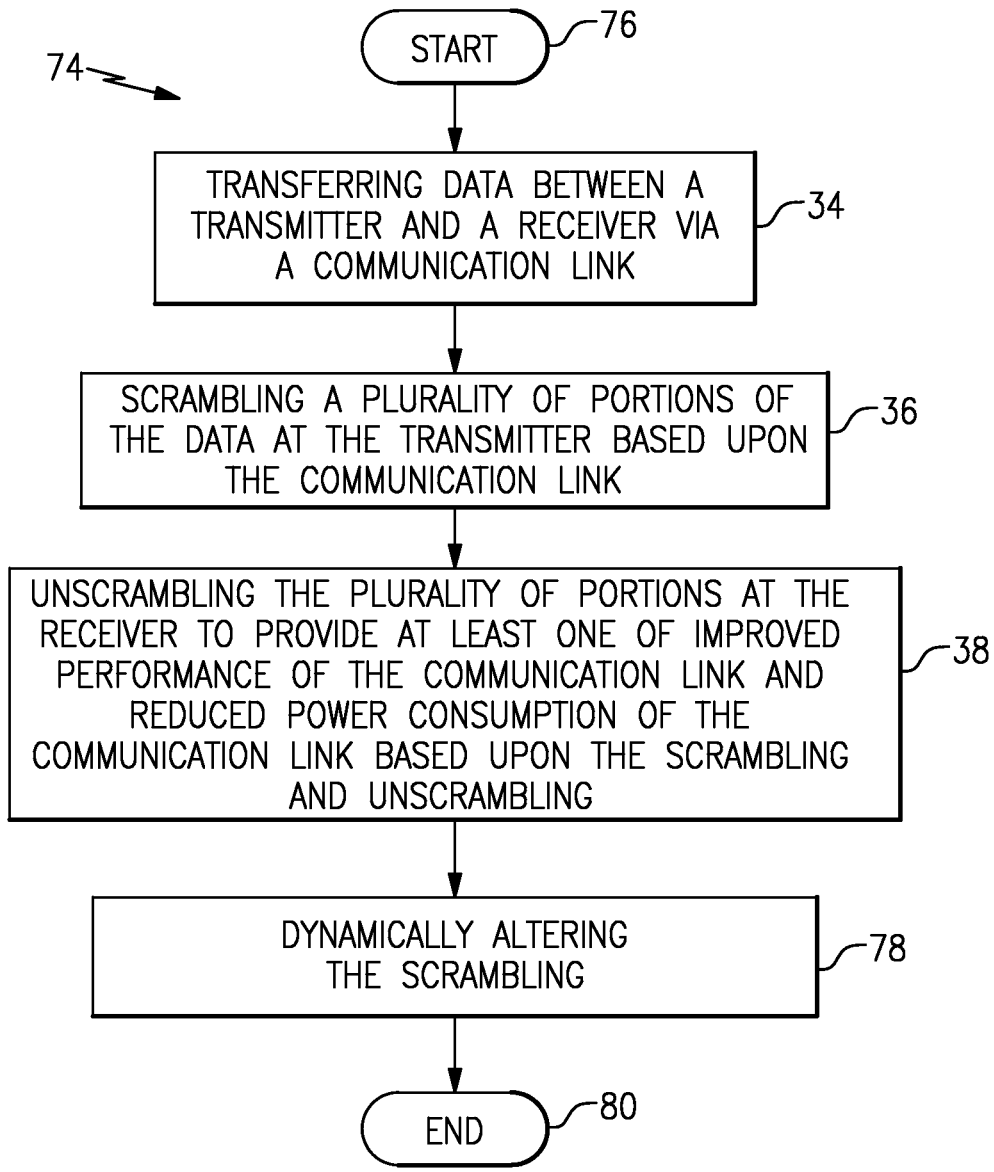
FIG. 11 is a flowchart illustrating another alternative method to improve a communications system using the method of FIG. 6.

In another method embodiment, which is now described with reference to flowchart 74 of FIG. 11, the method begins at Block 76. The method may include the steps of FIG. 6 at Blocks 34, 36, and 38. The method may also include dynamically altering the scrambling at Block 78. The method ends at Block 80.

Figure 12:
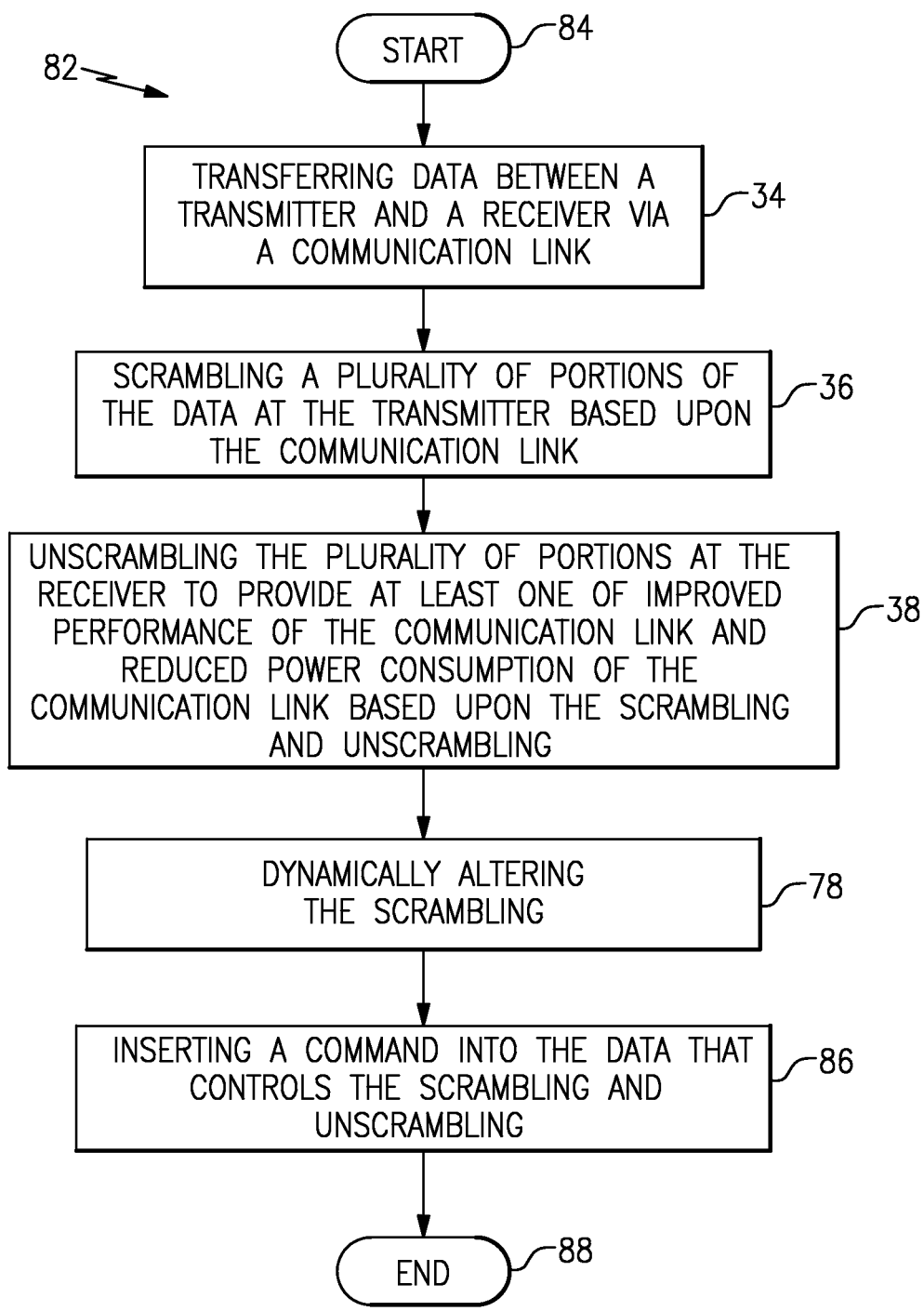
FIG. 12 is a flowchart illustrating another alternative method to improve a communications system using the method of FIG. 11.

In another method embodiment, which is now described with reference to flowchart 82 of FIG. 12, the method begins at Block 84. The method may include the steps of FIG. 11 at Blocks 34, 36, 38, and 78. The method may also include inserting a command into the data that controls the scrambling and unscrambling at Block 86. The method ends at Block 88.

Figure 13:
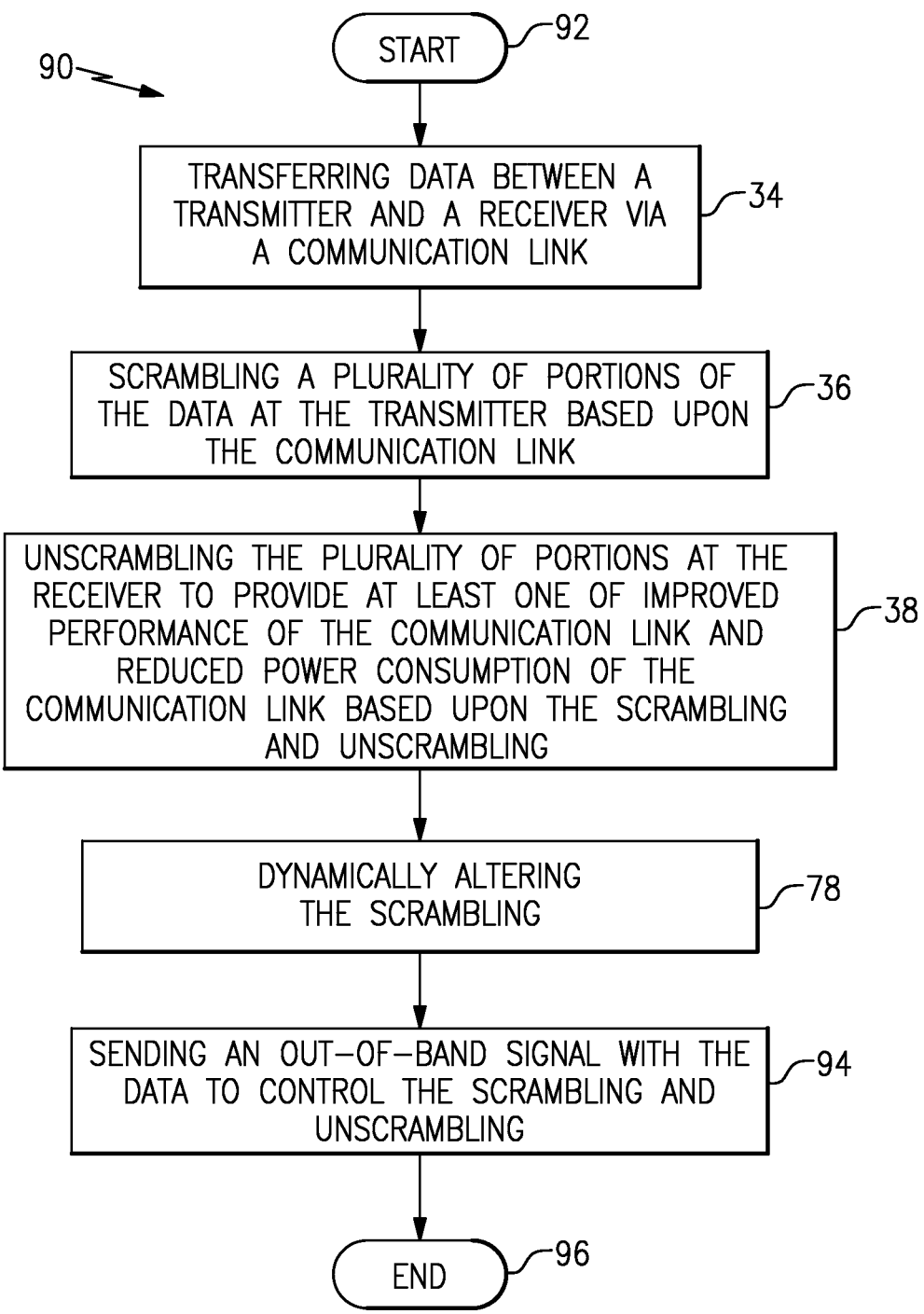
FIG. 13 is a flowchart illustrating another alternative method to improve a communications system using the method of FIG. 11.

In another method embodiment, which is now described with reference to flowchart 90 of FIG. 13, the method begins at Block 92. The method may include the steps of FIG. 11 at Blocks 34, 36, 38, and 78. The method may also include sending an out-of-band signal with the data to control the scrambling and unscrambling at Block 94. The method ends at Block 96.

Figure 14:
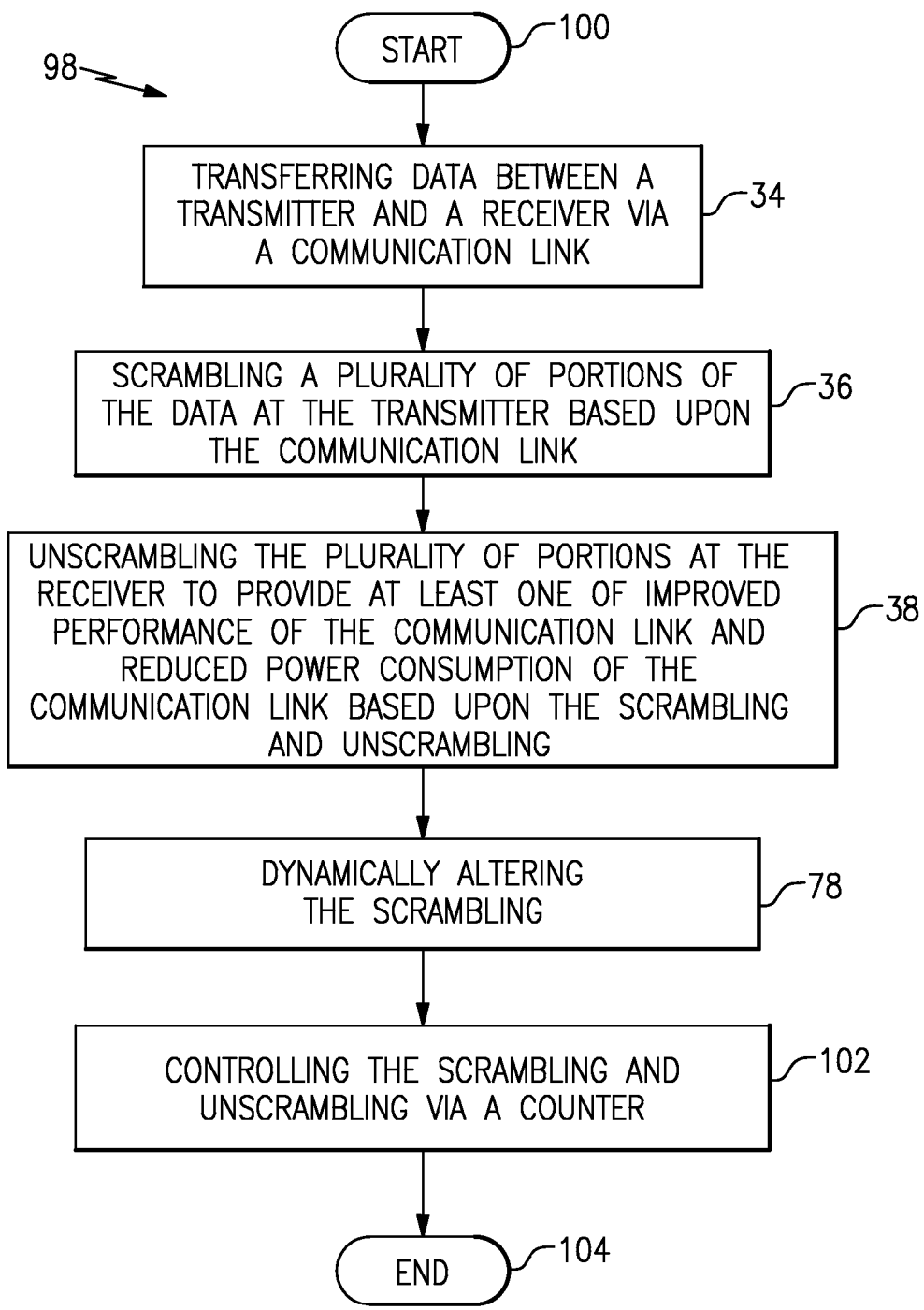
FIG. 14 is a flowchart illustrating another alternative method to improve a communications system using the method of FIG. 11.

In another method embodiment, which is now described with reference to flowchart 98 of FIG. 14, the method begins at Block 100. The method may include the steps of FIG. 11 at Blocks 34, 36, 38, and 78. The method may also include controlling the scrambling and unscrambling via a counter at Block 102. The method ends at Block 104.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that other modifications and embodiments are intended to be included within the scope of the appended claims.

That which is claimed is:

1. A communication system comprising:
    a logic unit to receive raw data having a first bit frequency for transmission by the communication system, and to combine a scramble pattern with the raw data at a second bit frequency, wherein the second bit frequency is different than the first bit frequency;
    a transmitter to transmit the combined raw data and scramble pattern;
    wherein said logic unit is configured to dynamically alter the second bit frequency in accordance with power dissipation requirements of the communication system; and
    a control register to limit the combining of the scramble pattern performed by said logic unit.

2. The system of claim 1 wherein said control register is statistically programmed to limit the combining of the scramble pattern performed by said logic unit.

3. A method to improve a communication system comprising:
- receiving raw data having a first bit frequency for transmission by the communication system combining a scramble pattern with the raw data at a second bit frequency, wherein the second bit frequency is different than the first bit frequency;
- transmitting the combined raw data and scramble pattern; and
- dynamically altering the second bit frequency in accordance with power dissipation requirements of the communication system; and
- limiting the combining the scramble pattern via a control register.

4. The method of claim 3 further comprising statistically programming the control register to limit the combining the scramble pattern performed.

\* \* \* \* \*